United States Patent
Chandrasekhar et al.

(10) Patent No.: US 6,400,860 B1
(45) Date of Patent: Jun. 4, 2002

(54) WAVELENGTH SELECTIVE POLARIZATION BEAM SPLITTER/COMBINER

(75) Inventors: Sethumadhavan Chandrasekhar, Matawan; Jiten Sarathy, Eatontown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,979

(22) Filed: Mar. 21, 2000

(51) Int. Cl.$^7$ ................................................ G02B 6/28
(52) U.S. Cl. .......................................... 385/24; 385/11
(58) Field of Search ...................... 385/11, 24, 27–30, 385/32, 37, 46; 359/122, 124, 127, 130

(56) References Cited

U.S. PATENT DOCUMENTS

| | | | | |
|---|---|---|---|---|
| 5,680,236 A | * | 10/1997 | Van Der Tol | 359/116 |
| 5,838,842 A | * | 11/1998 | Mackie | 359/489 |
| 6,181,848 B1 | * | 1/2001 | Bruno et al. | 385/15 |
| 6,236,781 B1 | * | 5/2001 | Doerr et al. | 359/124 |

OTHER PUBLICATIONS

Vellekoop et al., "A Small–Size Polarization Splitter Based on a Planar Optical Phased Array", Jan. 1990, Journal of Lightwave Technology, vol. 8, No. 1, pp. 118–124.*

J. Sarathy et al, "Polarization Insensitive Waveguide Grating Routers in InP," IEEE Photonics Tech. Letters, vol. 10, No. 12, Dec. 1998, pp1763–1765.

* cited by examiner

*Primary Examiner*—Akm E. Ullah
*Assistant Examiner*—Michelle R. Connelly-Cushwa
(74) *Attorney, Agent, or Firm*—John A. Caccuro

(57) ABSTRACT

A wavelength selective polarization beam device uses waveguide grating routers (WGRs) having birefringent grating waveguides. When the device is used as a splitter it separates different wavelength channels of a wavelength division multiplexed (WDM) signal as well as the orthogonal polarization components of each wavelength channel. Since the WGR device is reciprocal, it can also be used as a combiner to combine the orthogonal polarization components of each wavelength channel into a WDM signal.

14 Claims, 6 Drawing Sheets

WAVELENGTH SELECTIVE POLARIZATION BEAM SPLITTER/COMBINER

TECHNICAL FIELD OF THE INVENTION

This invention relates to a wavelength selective beam splitter/combiner and, more particularly, to a method of and apparatus for implementing a polarized wavelength selective beam splitter/combiner.

BACKGROUND OF THE INVENTION

One technique for increasing the capacity of a wavelength division multiplexed (WDM) transmission system is to increase the number of optical wavelengths that can be processed by the system. As the number of wavelengths increases, the wavelength separation between adjacent wavelength channels decreases resulting in an increase in the four wave mixing that occurs between adjacent wavelength channels. Moreover, because four wave mixing increases as a function of power level and distance these additional conditions must be considered in any WDM system design.

It is known that an optical signal outputted from an optical fiber has both a transverse electric, TE, and a transverse magnetic TM, modes. The TE and TM components could also be modulated and used as separate signal channels. Typically, however, optical systems are designed to modulate and process the merged TE and TM components as one signal rather than to separately modulate and process the TE and TM components of the signal. With reference to FIG. 1, prior systems did not separately process the TE and TM components because a separate polarizing beam splitter (PBS) 105 would be needed for each wavelength being demultiplexed by the system.

Because of the increasing demand for data transmission capacity, there is a continuing need to further increase the capacity of optical transmission systems.

SUMMARY OF THE INVENTION

In accordance with the present invention, we implement a wavelength selective polarization beam splitter/combiner using waveguide grating routers (WGRs) having birefringent grating waveguides.

More particularly, in accordance with our invention, a birefringent wavelength grating router (WGR) comprises (1) a first star coupler having an input and a first plurality of outputs, the input for receiving an N channel wavelength division multiplexed, WDM, signal; (2) a second star coupler having a first plurality of inputs and N pairs of outputs, each output pair associated with different orthogonal polarization states of one wavelength of the WDM signal and each output pair having a first predetermined spatial wavelength separation therebetween and a second predetermined spatial wavelength separation from an adjacent output pair; and (3) an optical grating including a first plurality of unequal length birefringent grating waveguides connecting the first plurality of first star coupler outputs and the first plurality of second star coupler inputs, the path length difference of adjacent grating waveguides determining the first and second spatial wavelength separations.

In other embodiments, the spatial separation between the output ports of the second star coupler can be made the same or unequal. In another embodiment, each wavelength uses only one polarization and adjacent wavelengths are orthogonally polarized to reduce four wave mixing of the wavelengths. In a further embodiment, the WGR uses birefringent grating waveguides having a uniform cross section core while in another embodiment different parts of the waveguides have different cross sections.

BRIEF DESCRIPTION OF THE DRAWINGS

In the drawings.

In the following description, identical element designations in different figures represent identical elements. Additionally in the element designations, the first digit refers to the figure in which that element is first located (e.g., 105 is first located in FIG. 1).

DETAILED DESCRIPTION

Figure 1:
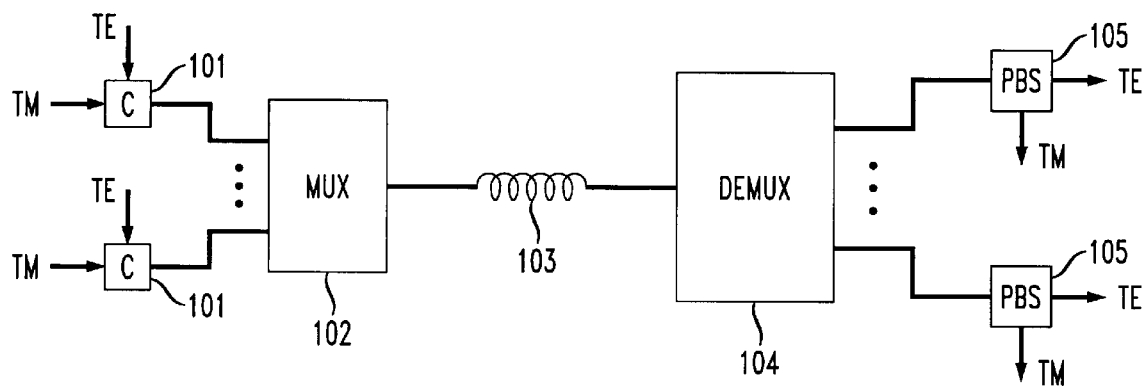
FIG. 1 shows an illustrative block diagram of a prior art WDM system, including an multiplexer and demultiplexer implemented using a separate polarizing beam splitter (PBS) to separate the transverse electric, TE, and a transverse magnetic TM, signal channels processed by the system.

Shown in FIG. 1 is an illustrative block diagram of a prior art WDM system arranged to transmit separately modulated transverse electric, TE, and a transverse magnetic TM, signal components or channels. The separately modulated TE and TM channels of each wavelength are combined in a combiner 101 and formed into a TE/TM interleaved WDM signal in multiplexer 102. The resulting signal is sent over optical fiber 103 to demultiplexer 104 where separate splitters 105 split each wavelength into its TE and TM components. Undesirably, this arrangement requires a separate combiner 101 and splitter 105 for each wavelength of the WDM signal.

Figure 2:
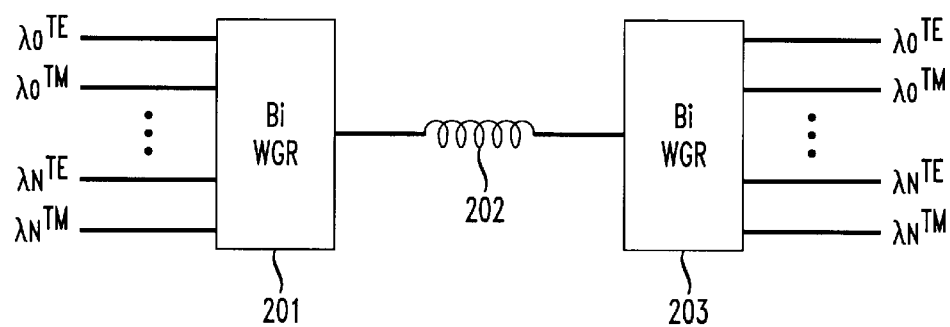
FIG. 2 shows, in accordance with the present invention, an illustrative block diagram of our WDM system, including a wavelength selective polarization beam combiner and splitter, arranged to use the TE and TM modes of each wavelength as separate signal channels.

FIG. 2 shows, in accordance with the present invention, an illustrative WDM optical system, including a wavelength selective polarization beam combiner 201 and splitter 203, each implemented using a birefringent WGR. The WDM system is arranged to directly input/output the TE and TM orthogonal components of each wavelength as separate signal channels. Thus if a WDM signal has N wavelengths, each with TE and TM components, the combiner 201 has 2N input ports and splitter 203 has 2N output ports to separately handle each of the TE and TM components of each of the N wavelengths.

Figure 3:
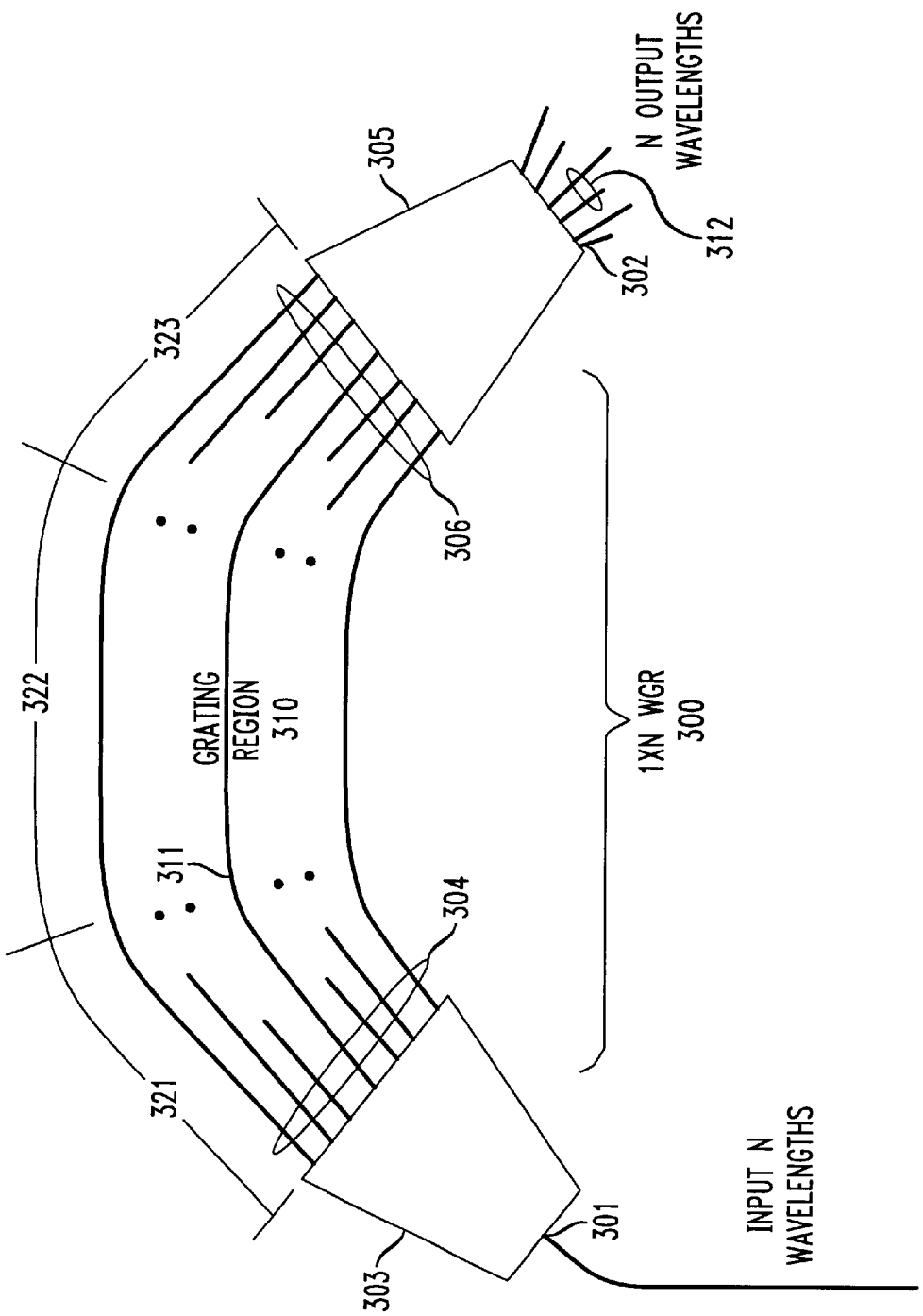
FIG. 3 shows a diagram of our birefringent waveguide grating router (WGR)

FIG. 3 shows a diagram of our birefringent waveguide grating router (WGR) 300 used to implement both the wavelength selective polarization beam combiner 201 and splitter 203. The WGR 300 is a 1×N device that is used to demultiplex an optical spectrum of a WDM input inputted at port 301 into its N separate wavelengths at ports 302. Note, since each of the N wavelengths have two polarization components, the WGR has 2N output ports. Since the WGR 300 is reciprocal in operation, it can also be used as a multiplexer with N separate wavelengths inputted into ports 302 and a WDM signal outputted from port 301. The WGR 300 may be implemented in the manner described in U.S. Pat. No. 5,136,671, issued to C. Dragone on Aug. 4, 1992, which description is incorporated by reference herein.

The WGR 300 is shown to include a first star coupler 303, a second star coupler 305, and an optical grating region 310. The first star coupler 303 has an input port 301 and a plurality of output ports 304. The input port 301 is used for receiving an N channel WDM signal which is distributed to the plurality of output ports 304. The second star coupler 305 has a plurality of input ports 306 and 2N output ports 302, each output port associated with a demultiplexed TE or TM component of a wavelength of the WDM signal. The optical grating 310 includes a plurality of unequal length birefringent grating waveguides which connect between the output ports 304 of star coupler 303 to the input ports 306 of star coupler 305.

The spatial position of each demultiplexed wavelength on the output ports 302 depends upon the path length of the central waveguide 311 in the grating region 310 of WGR 300. The wavelength separation at the various output ports is determined by the path length difference $\Delta L$ between the adjacent waveguides of the grating region 310. By precisely designing this path length difference, $\Delta L$, output wavelength separations of 0.8 nm (100 GHz frequency separation) and 0.4 nm (50 GHz frequency separation) are now achieved routinely.

The path length of the central waveguide 311 of grating region 310 is a product of the effective index, n, of the waveguided mode and the physical length, L, of the central waveguide 311. The relationships of the central wavelength $\lambda o$ and the wavelength separation, $\Delta \lambda$, of WGR 300 to the physical length L of the central waveguide 311 and the physical length difference, $\Delta L$, between the waveguides are as follows $$m \cdot \lambda o = \cdot L$$

$$\Delta \lambda / \lambda o = \Delta L / L$$

Here m is a constant known as the "grating order." If the waveguides in the grating region 311 of the WGR support only a single transverse optical mode, there is a unique effective index n that applies in the relationship shown above. In WGRs with multimode waveguides, there is more than one effective index $n_i$ (i=1, . . . N) to contend with. Consequently, $\lambda o$ and $\Delta \lambda$ will be different for the different transverse modes and the WGR 300 does not work effectively.

Figure 4:
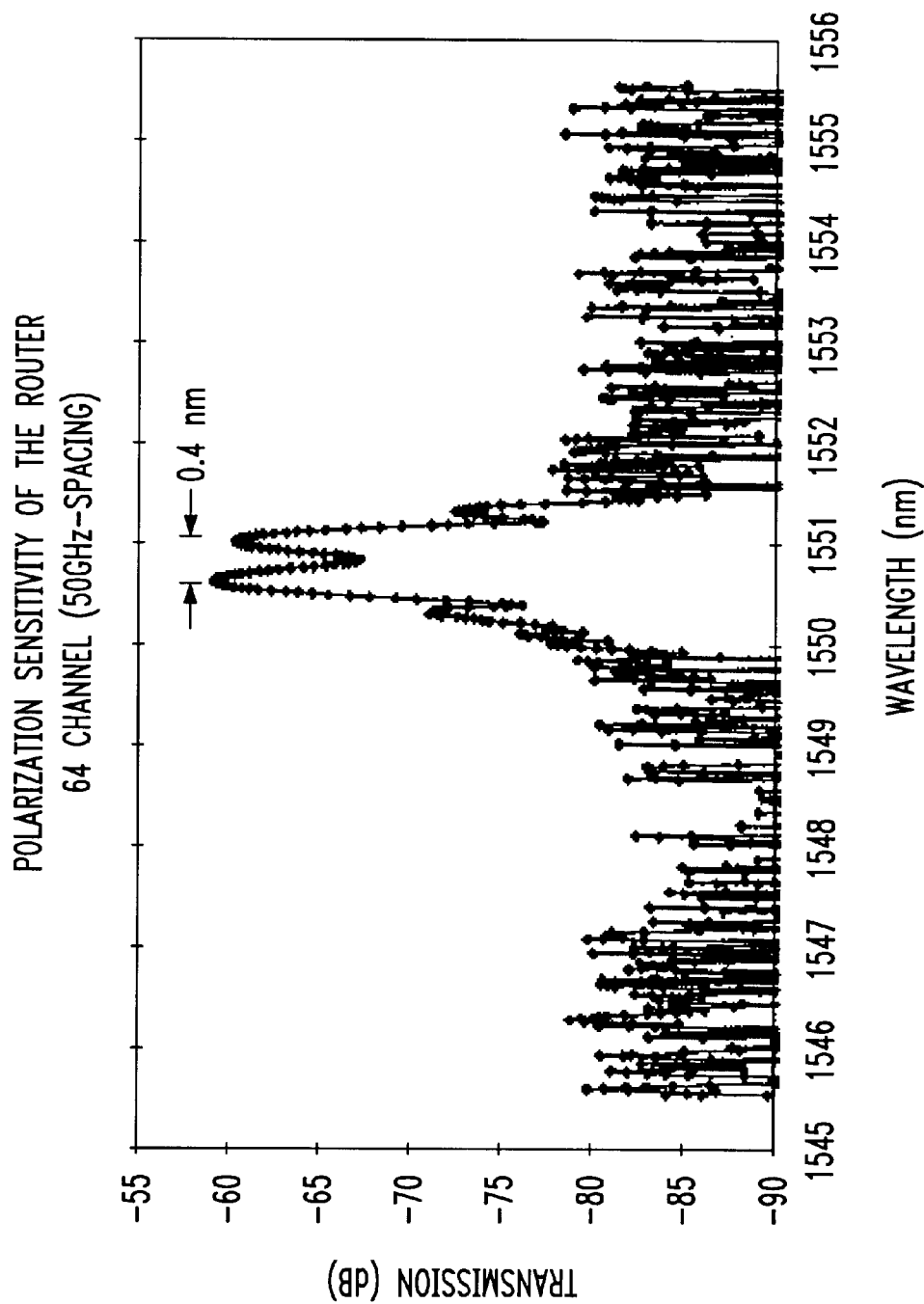
FIG. 4 shows an illustrative spectral response of one output of a WGR showing the TE and TM components.

Often, in a single transverse mode the grating waveguides are able to sustain the two polarization states—namely TE and TM. In this case, $n_{TE} - n_{TM}$ is typically on the order of 0.001. While L is typically three to four orders of magnitude greater than $\lambda o$, $\Delta L$ is no more than 20–30 times larger than $\lambda o$. Consequently, the spatial difference between $\lambda o_{TE}$ and $\lambda o_{TM}$ may be significant without a significant difference between $\Delta \lambda_{TE}$ and $\Delta \lambda_{TM}$. In a WGR, this results in an output spectrum with two distinct components as shown in FIG. 4—one associated with the TE polarization state (or component) and the other associated with the TM polarization state of the fundamental transverse mode. FIG. 4 illustratively shows the response spectrum of one wavelength channel of a 32 channel WDM signal having 100 GHz separation between channels. The two peaks in the passband of the 1551 nm wavelength channel represent the orthogonal TE and TM components of the 1551 nm wavelength signal. The peaks are separated by $\Delta \lambda_{TE-TM}$=0.4 nm (50 GHz at 1551 nm). In accordance with the present invention, we have illustratively designed star coupler 305 of WGR 300 to have 64 channels (50 GHz spacing), a TE and TM pair of channels for each of the 32 wavelengths of the WDM signal inputted to star coupler 303. Thus, each TE and TM component of each wavelength has its own output port at star coupler 305. Note, since WGR 300 is reciprocal it is also used as a multiplexer, e.g., 201 of FIG. 2. When used as a multiplexer the data modulated TE and TM components of each wavelength would enter a separate port into star coupler 305 and be multiplexed together to form a 64 channel WDM signal (TE and TM components for each of 32 wavelengths).

Figure 5:
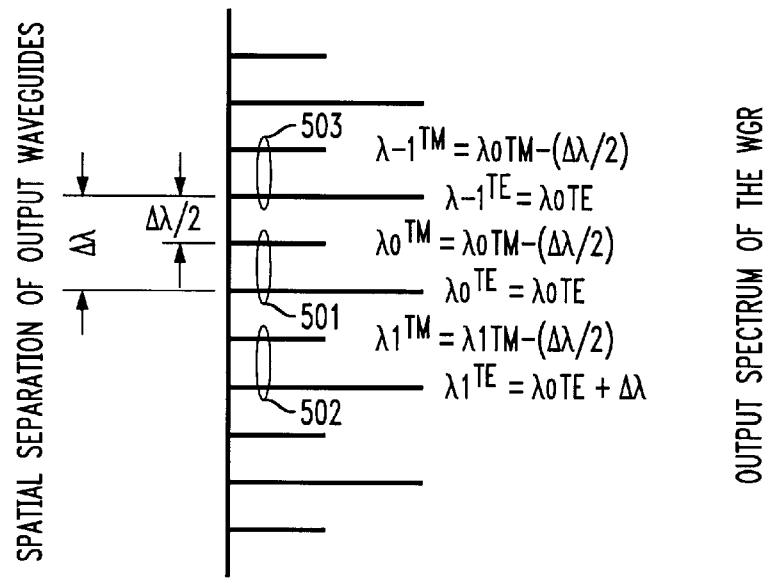
FIG. 5 shows, illustratively, the spatial separation of the output ports and the resulting output spectrum of our birefringent WGR.

More generally, we design a WGR 300 such that the difference between $\lambda o_{TE}$ and $\lambda o_{TM}$ is equal to $\Delta \lambda/2$. Along with this, our design includes output ports at star coupler 305 having a spatial separation corresponding to a wavelength separation $\Delta \lambda/2$. In this case, the output spectrum consists of separate TE and TM modes (or components) for each wavelength. Thus if an input WDM signal to port 301 of WGR 300 has N wavelengths, there are 2N output ports 302, a pair of output ports for each of the N wavelengths. The spectra of wavelength separation $\Delta \lambda$ are interleaved with a spatial separation between the TE and TM of $\Delta \lambda/2$ as shown in FIG. 5. As shown by 501 $\lambda o_{TE}$ and $\lambda o_{TM}$ are the polarization components of wavelength $\lambda o$ that appear on the pair of output ports 312 of WGR 300 associated with wavelength $\lambda o$. As shown, the TE and TM component pairs for different wavelengths, e.g. 501, 502, 503, are separated by $\Delta \lambda$, while the TE and TM components of the same wavelength are spatially separated by a distance corresponding to $\Delta \lambda/2$.

Thus, by controlling the path length difference of adjacent grating waveguides 310 of FIG. 3 results in a WGR 300 having output ports 302 with the desired $\Delta \lambda$ wavelength separation and $\Delta \lambda/2$ TE and TM component separations. The resulting WGR device 300 is a Wavelength Selective Polarization Beam Splitter (WSPBS) for an input WDM signal spectrum with a wavelength separation of $\Delta \lambda$ that contains both TE and TM polarized light. Since both the TE and TM components are data modulated each wavelength has effectively doubled its data transmission capacity. Additionally, since this device is completely reciprocal, if N wavelengths of orthogonal polarization are launched into the correct output ports 302, the multiplex of the N wavelengths with orthogonal polarization will appear at the input port 301. Operated in this manner the device of FIG. 3 acts as a Wavelength Selective Polarization Beam Combiner (WSPBC). Using a WSPBC device as the multiplexer 201 and a WSPBS device as the demultiplexer 203 of the optical system of FIG. 2 results in the doubling of the "spectral efficiency" of that optical system thereby effectively doubling the data capacity of the optical system. Note, if the length of fiber 202 is not too long, it does not have to be a polarization maintaining fiber.

In an optical system, as the number of wavelengths increases, the wavelength separation between adjacent wavelength channels decreases resulting in an increase in the four wave mixing that occurs between adjacent wavelength channels. Four wave mixing increases directly as a function of power level of the wavelength signals and inversely to the fourth power, i.e., $(1/\Delta\lambda)^4$, with the distance between adjacent wavelengths. However, four wave mixing occurs only between wavelengths of the same polarization. While the separation of the TE and TM components of the wavelengths in FIG. 5 is $\Delta\lambda/2$, the adjacent wavelengths of the same polarization have a spacing of $\Delta\lambda$, consequently the four level mixing would be about one sixteenth of that of a prior art system that utilized non-polarized wavelengths spaced $\Delta\lambda/2$ apart.

Figure 6:
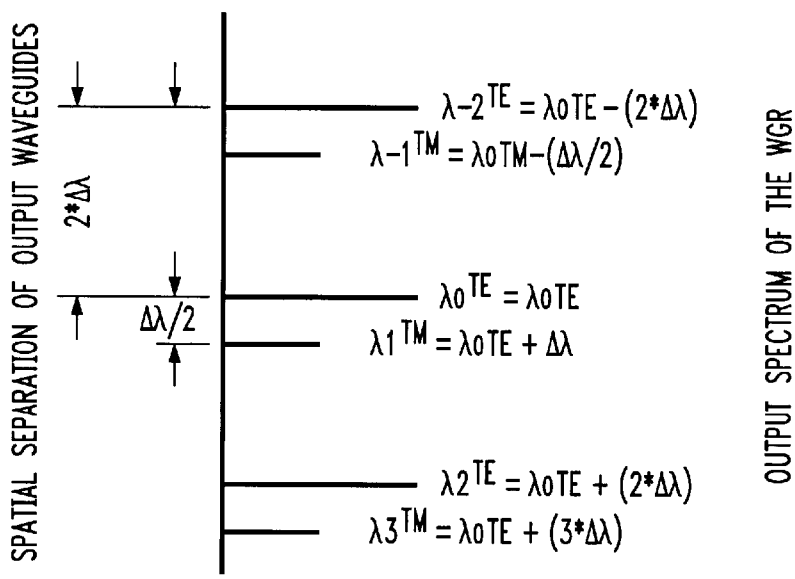
FIG. 6 shows, illustratively, an uneven spatial separation of the output ports and the resulting output spectrum of our birefringent WGR.

In accordance with another aspect of the present invention, WGR 300 is designed so as to further decrease four wave mixing. As shown in FIG. 6, the output port spacing between the output ports 302 of WGR 300 are not uniformly spaced. In this arrangement, all odd wavelengths are TM polarized and all even wavelengths are TE polarized. In this embodiment, the separation between wavelengths having the same polarization is $2\Delta\lambda$. The odd and even wavelengths are interleaved together with a $\Delta\lambda/2$ offset separation therebetween, e.g., $\lambda-1^{TM}$ and $\lambda o^{TE}$. Since wavelengths of the same polarization are separated by $2\Delta\lambda$, e.g., see $\lambda-1^{TE}$ and $\lambda o^{TM}$, four wave mixing is reduced by a factor of 16 over that of FIG. 5.

Figure 7A:
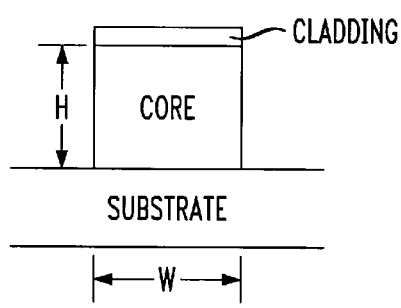
FIGS. 7a and 7b illustratively show, respectively, the core cross section of a grating waveguide of a typical WGR and the core cross section of a grating waveguide of our birefringent WGR.
Figure 7B:
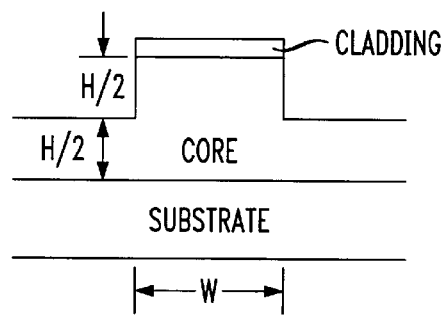

FIGS. 7a and 7b illustratively show, respectively, the core cross section of a grating waveguide of a typical WGR and the core cross section of grating waveguides, e.g., 311, of our birefringent WGR. In FIG. 7a, the core of a grating waveguide of a typical WGR is illustratively formed from a substrate that has a core material deposited thereon. This core material may, illustratively, be about 2.1 $\mu$m of Indium Phosphide (InP) or about 7 $\mu$m of silica. The grating waveguides paths are then cladded so as to have a path width of about 1.9 $\mu$m if InP is the core material or about 7 $\mu$m if silica is the core material. After etching, the prior art grating waveguides path would have a crosssection with an aspect ratio (height H to width W ratio) of about one. Thus the effective index n is about the same for both the TE and TM modes.

With reference to FIG. 7b, our birefringent WGR 300 has grating waveguides paths that are only partially etched to have a height of about 0.9 $\mu$m if InP is the core material or about 3.5 $\mu$m if silica is the core material. As shown, about half of the core material would remain between the grating waveguides paths (1.1 $\mu$m if InP is the core material or 3.5 $\mu$m if silica is the core material). The result is that our birefringent WGR has grating waveguides paths with an aspect ratio of about 0.5 rather than about 1 as in the prior art. Consequently, the effective difference in index $\Delta n=TE-TM$ is about 0.001 compared to about zero for the prior art arrangement of FIG. 7a.

Figure 8:
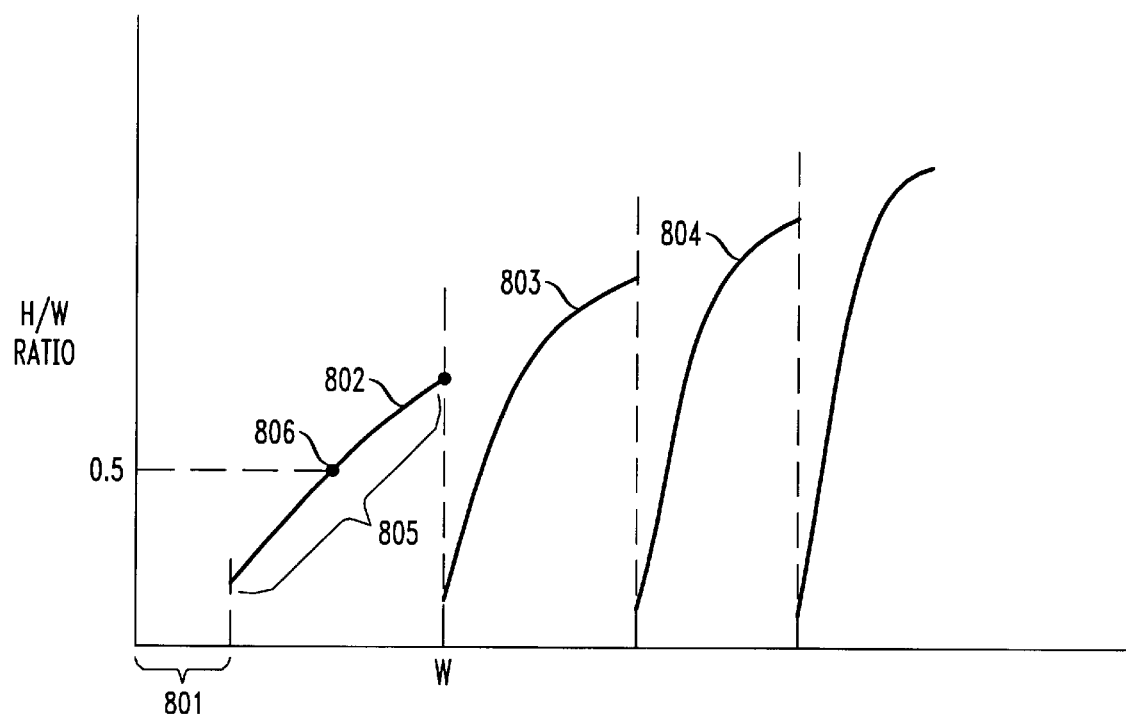
FIG. 8 shows an illustrative diagram of the range of aspect ratios of the height to width that may be used for a grating waveguide core of our birefringent WGR.

With reference to FIG. 8, there is shown a diagram illustrating the range of aspect ratios of the height (H) to width (W) that may be used for a grating waveguide core of our birefringent WGR. To insure that grating waveguide transmission losses are not excessive, a minimum grating waveguide path width 801 should be used. The prior art H to W aspect ratios for operation using different transverse optical modes (1TE, 1TM; 2TE, 2TM; and 3TE, 3TM) are shown in regions 802–804. In region 802 one optical mode 1TE, 1TM is sustained, while in region 803 multiple modes 1TE, 1TM; 2TE, 2TM are sustained, and in region 803 multiple modes 1TE, 1TM; 2TE, 2TM; and 3TE, 3TM are sustained. It should be noted that multiple modes are sustained for lower H/W ratios as the width increases beyond W. The range for operating aspect ratios to obtain a desired birefringence for a WGR is shown as 805, along with our illustrative 0.5 aspect ratio 806.

Figure 9A:
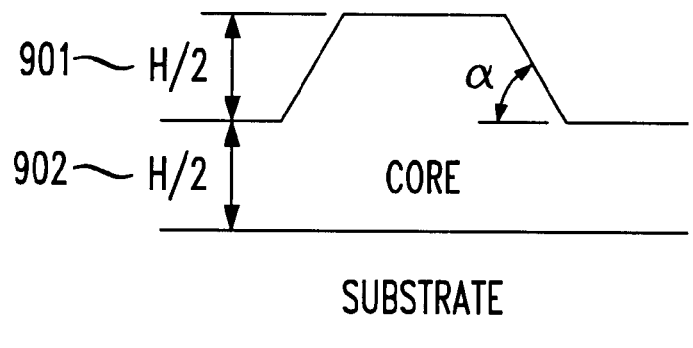
FIGS. 9a and 9b show an illustrative trapezoidal cross section that may be used for a grating waveguide of our birefringent WGR.
Figure 9B:
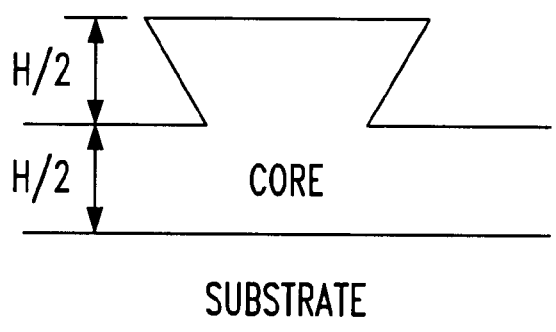

According to another feature of the present invention, the cross-section of the core area may have an upright or inverted trapezoidal shape as shown in FIGS. 9a and 9b, respectively. The heights H/2 shown in 901 and 902 are for illustrative purposes only. In general, the birefringence is a function of the width and depth of etch and the included angle $\alpha$ of the trapezoid. With reference to FIG. 2, different sections (321, 322, and 323) of the grating waveguides may alternately use the upright and inverted trapezoidal shaped core sections. Since the upright or inverted trapezoidal shaped core sections have different birefringent characteristics, a combination of them can be used to obtain the overall desired birefringent characteristics needed for the WGR 300.

What has been described is merely illustrative of the application of the principles of the present invention. Other methods and arrangements can be implemented by those skilled in the art without departing from the spirit and scope of the present invention.

What is claimed is:

1. A birefringent wavelength grating router comprising
   a first star coupler having an input and a first plurality of outputs, the input for receiving an N channel wavelength division multiplexed, WDM, signal;
   a second star coupler having a first plurality of inputs and N pairs, N>1, of outputs, each output pair outputting different orthogonal polarization components of one wavelength of the WDM signal and each output pair having a first predetermined spatial wavelength separation therebetween and a second predetermined spatial wavelength separation from an adjacent output pair; and
   an optical grating including a first plurality of unequal length birefringent grating waveguides connected between the first plurality of first star coupler outputs and the first plurality of second star coupler inputs, the path length difference of adjacent grating waveguides determining the first and second spatial wavelength separations.

2. The birefringent wavelength grating router of claim 1 wherein the second spatial wavelength separation is twice the first spatial wavelength separation.

3. The birefringent wavelength grating router of claim 1 wherein the unequal length birefringent grating waveguides have a cross section core with a height to width ratio that is significantly less than one.

4. The birefringent wavelength grating router of claim 1 wherein the birefringent grating waveguides have a core cross section with a height to width ratio of approximately one half.

5. The birefringent wavelength grating router of claim 1 wherein the birefringent grating waveguides have a core region made using an Indium Phosphide or a silica based material.

6. The birefringent wavelength grating router of claim 5 wherein the birefringent grating waveguides are formed by etching part of the way through a core layer material deposited on a substrate layer.

7. The birefringent wavelength grating router of claim 1 arranged as a wavelength selective polarization beam splitter wherein each of the N channels of the WDM signal contain both a transverse electrical, TE, and a transverse magnetic, TM, components.

8. The birefringent wavelength grating router of claim 1 arranged as a wavelength selective polarization beam combiner where each transverse electrical, TE, and a transverse magnetic, TM, components of each of the N channels are inputted to corresponding N pairs of the outputs of the second star coupler and where the input of the first star coupler serves as an output terminal for a multiplexed N channel signal including the TE and TM components of each of the N wavelengths.

9. The birefringent wavelength grating router of claim 1 wherein at least one of the birefringent grating waveguides have an upright or inverted trapezoidal cross-section.

10. The birefringent wavelength grating router of claim 1 wherein at least one of the birefringent grating waveguides includes a plurality of sections, at least one section having an upright trapezoidal cross-section and at least one section having an inverted trapezoidal cross-section.

11. A birefringent wavelength grating router comprising
- a first star coupler having an input and a first plurality of outputs, the input for receiving an N channel wavelength division multiplexed, WDM, signal, wherein the odd and even numbered wavelengths of the N channel WDM input signal have different polarization;
- a second star coupler having a first plurality of inputs and N, N>1, outputs, each alternate output outputting an odd or even numbered wavelength of the WDM signal and wherein the outputs of all even and all odd numbered wavelengths have a first spatial separation therebetween and wherein pairs of even and odd numbered wavelength outputs have a second predetermined spatial wavelength separation therebetween; and
- an optical grating including a first plurality of unequal length birefringent grating waveguides connected between the first plurality of first star coupler outputs and the first plurality of second star coupler inputs, the path length difference of adjacent grating waveguides determining the first and second spatial wavelength separations.

12. The birefringent wavelength grating router of claim 11 wherein the outputs of all even and all odd numbered wavelengths are interleaved to be equally spaced and the first spatial wavelength separation is twice the second spatial wavelength separation.

13. The birefringent wavelength grating router of claim 11 wherein the outputs of all even and all odd numbered wavelengths are interleaved but have unequal second spatial wavelength separations between adjacent even and odd outputs and wherein first spatial wavelength separation is four times a smaller of the two unequal second spatial wavelength separations.

14. A method of operating a birefringent wavelength grating router comprising the steps of
- receiving an N channel wavelength division multiplexed, WDM, signal at an input of a first star coupler having a first plurality of outputs;
- forming a first and second orthogonal polarization component of each of the wavelengths of the WDM input signal using birefringent grating waveguides connected between the first plurality of first star coupler outputs and a first plurality of inputs of a second star coupler, and
- at the second star coupler having N pairs of outputs, N>1, outputting at each output of the output pair a different one of the polarization components of one wavelength of the WDM signal and wherein each output pair has a first predetermined spatial wavelength separation therebetween and a second predetermined spatial wavelength separation from an adjacent output pair, and wherein the path length difference of adjacent grating waveguides determines the first and second spatial wavelength separations.

* * * * *